US009357576B2

(12) United States Patent
Gupta et al.

(10) Patent No.: US 9,357,576 B2
(45) Date of Patent: May 31, 2016

(54) AUTOMATIC PAIRING FOR PORTABLE COMPUTING DEVICES

(71) Applicant: Intel Corporation, Santa Clara, CA (US)

(72) Inventors: Meenakshi Gupta, Portland, OR (US); James W. Edwards, Hillsboro, OR (US); Bryan Y. Roe, Camas, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/499,114

(22) Filed: Sep. 27, 2014

(65) Prior Publication Data

US 2016/0095145 A1 Mar. 31, 2016

(51) Int. Cl.
*H04W 76/02* (2009.01)
*H04W 4/00* (2009.01)
*H04W 84/18* (2009.01)

(52) U.S. Cl.
CPC ............ *H04W 76/023* (2013.01); *H04W 4/008* (2013.01); *H04W 84/18* (2013.01)

(58) Field of Classification Search
CPC ................................. H04B 5/02; H04W 4/008
USPC ................................................ 455/41.1, 41.2
See application file for complete search history.

(56) References Cited

U.S. PATENT DOCUMENTS 8,472,874 B2 * 6/2013 Tang et al. .................... 455/41.2
8,913,957 B2 * 12/2014 Eun et al. ..................... 455/41.2

* cited by examiner

*Primary Examiner* — Tuan H Nguyen
(74) *Attorney, Agent, or Firm* — Jordan IP Law, LLC

(57) ABSTRACT

Systems and methods may provide for establishing automatic pairing between a portable computing device and a base device. A processor is configured to receive a dock event notification when the portable computing device docks with the base device. An identifier retriever is configured to retrieve the identifier of a wireless communication component in a base device. A pairing portion of the processor is configured to automatically pair a wireless communication component in a portable computing device with the wireless communication component in the base device. Automatic wireless connection may follow automatic pairing.

18 Claims, 4 Drawing Sheets

AUTOMATIC PAIRING FOR PORTABLE COMPUTING DEVICES

TECHNICAL FIELD

Embodiments generally relate to portable computing devices and wireless communication between portable computing devices and base devices such as base devices that include keyboards.

BACKGROUND

Portable computing devices such as tablets, smart phones, and personal digital assistants are increasing in popularity. These portable computing devices generally do not have a base device including a physical keyboard; a user typically uses a touchscreen keyboard for inputting text. Base devices including keyboards, often sold as accessories, may be added to the portable computing device for the convenience of the user. These base devices require user configuration in order to wirelessly pair or connect the base device to the portable computing device so that the portable computing device receives input from the keyboard, an inconvenience for the user. As an alternative, some bases use a wireless transmitter that is plugged into a port on the portable computing device. These wireless transmitters are pre-paired with a base during manufacture, requiring extra hardware, an extra manufacturing process, and increasing the expense of the system.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION

Figure 1:
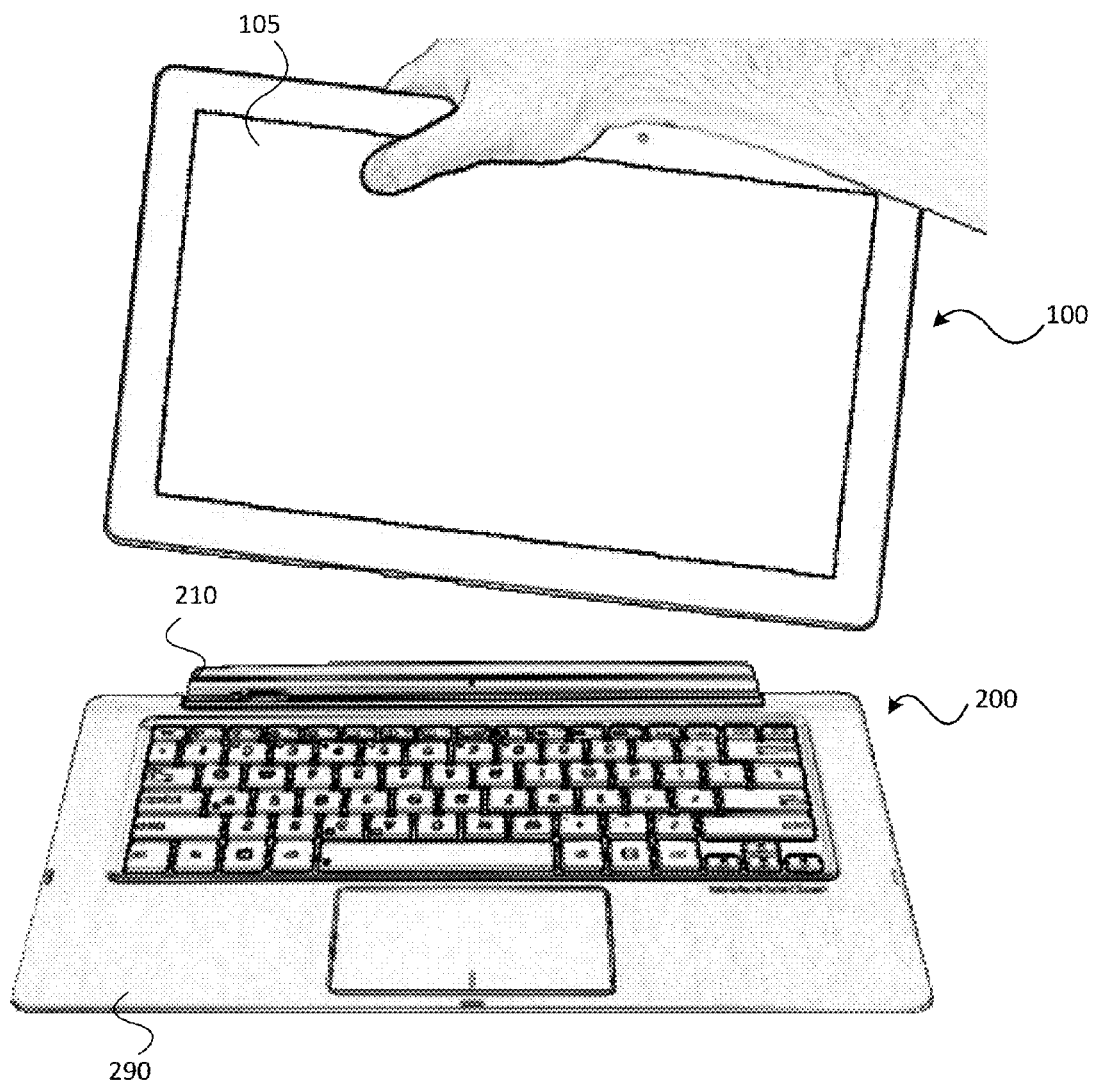
FIG. 1 is an illustration of an example of portable computing device and base device including a keyboard.

FIG. 1 shows a portable computing device 100 and a base device 200. The portable computing device 100 may be a tablet as depicted in FIG. 1 or it may be a mobile phone, personal digital assistant or any other portable computing device that may be used with a base device 200. The base device 200 may include a receiving portion 210 for providing physical support for the portable computing device 100. The base device 200 may also include a keyboard 290. As depicted in FIG. 1, the portable computing device 100 is about to dock with the base device 200.

Figure 2:
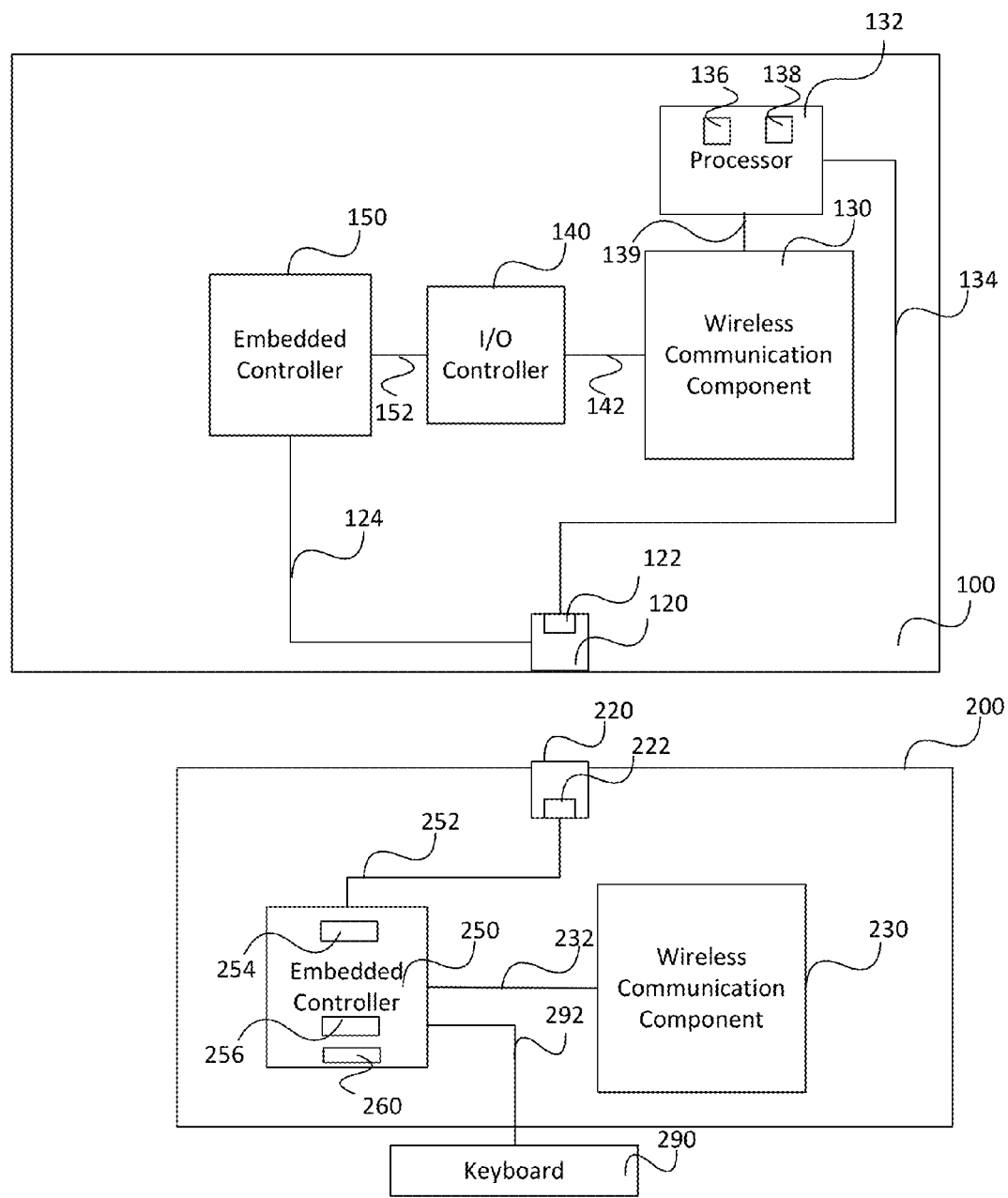
FIG. 2 is a block diagram of an example of components in a portable computing device and a base device according to an embodiment.

As seen in the block diagram of FIG. 2, the portable computing device 100 includes a docking port 120 that is connectable to a docking port 220 of the base device 200. In the docking port 120 there is a docking switch 122 that is closed when the portable computing device docking port 120 is docked with the base device docking port 220. The base docking port 220 optionally includes a switch portion 222. For interconnection purposes, one of the docking ports may have a male configuration and one of the docking ports may have a female configuration. Exemplary docking ports include USB (Universal Serial Bus e.g., USB Specification 3.0, Rev. 1.0, Nov. 12, 2008, USB Implementers Forum), I2C (Inter-Integrated Circuit Bus, e.g., NXP Semiconductors, UM10204 v. 6 Apr. 4, 2014), and SPI (Serial Peripheral Interface Bus, e.g., Motorola MC68HC11A8 Rev. 5.1 July, 2005) ports although other types of docking ports may also be used.

Continuing with the description of FIG. 2, the docking port 120 of the computing device 100 communicates with a processor 132 along a communication path 134. The processor communicates with a wireless communication component 130 via a communication path 139. The processor 132 is configured to receive a dock event notification when the portable computing device 100 docks with the base device 200. The processor 132 may include a pairing portion 136 and a connection portion 138 for facilitating automatic pairing and automatic wireless connection between the wireless communication component 130 and the base device 200. The portable computing device 100 further includes an embedded controller 150 that communicates with an input/output controller 140 via a communication path 152. In one embodiment, the communication path 152 may be an LPC bus (Low Pin Count Bus) although other types of communication paths may also be used. The embedded controller 150 may also communicate with the docking port 120 through a communication path 124. The communication path 124 may be an electrical communication path. Input/output controller 140 communicates with the wireless communicator 130 through a communication path 142 which may, in one embodiment, be a USB.

In the base device 200, the docking port 220 communicates with an embedded controller 250 along a communication path 252. The base device 200 further includes a wireless communication component 230 and a communication path 232 between the embedded controller 250 and the wireless communication component 230. The embedded controller 250 may include a query receiver 254 to receive a query from the portable computing device 100 regarding an identifier of the base wireless communication component 230. The embedded controller 250 may further include an identifier transmitter 256 to transmit an identifier of the base wireless communication component 230. In one embodiment, the embedded controller 250 may include a pair process director 260 to facilitate automatic pairing with the portable computing device 100. The pair process director 260 may set device 230 in a "discoverable mode" so that wireless device 130 in portable computing device 100 can find it. This is initiated automatically by the pair process director 260 when the portable computing device 100 is docked to the base device 200. A keyboard 290 may be connected to the embedded controller 250 by the communication path 292. Input from the keyboard 290 may be routed via the embedded controller to the wireless communication device 230 for transmission over a wireless channel established when the base wireless communication component 230 is wirelessly connected to the wireless communication component 130 in the portable computing device 100.

Note that the communication paths 124 and 252 that permit electrical communication between the embedded controllers 150 and 250 constitute an out-of-band channel that permits transmission of an identifier such as a wireless component address (e.g., a MAC (Media Access Control) address without the use of a wireless channel between the portable computing device 100 and the base device 200. As a result of this automatic pairing, there is no need for a user to put the base device 200 into a discovery mode and then initiate pairing from the portable computing device 100. Further, there is no need for pre-pairing at the factory as information is discoverable through direct communication between the devices 100 and 200. This results in less frustration for the user and overall decreased cost of the portable computing device-base device system.

In operation, the portable computing device 100 and the base device 200 are docked together using the docking ports 120 and 220. Upon docking, the docking switch 122 is closed. When docking for the first time, this event triggers the processor 132 to instruct the embedded controller 150 of the portable computing device 100 to communicate with the embedded controller 250 of the base device 200 to retrieve an identifier of the base wireless communication component 230 such as a MAC (Media Access Control) address through the docking ports 120 and 220. The docking also causes the wireless communication component 230 to be placed in an "active state" by pair process director 260. The wireless communication component 130 is placed in an active condition by the processor 132, to prepare it for potential pairing. By "active condition" it is meant that a radio portion of each of the wireless communication components 130 and 230 transmits information about itself according to a selected radio protocol, allowing each of wireless communication components 130 and 230 to be discoverable and establish pairing. Pairing may be directed by the pairing portion 136 of processor 132. Once pairing is established, the connection portion 138 of controller 138 may establish connection between the wireless communication components 130 and 230 such that data can be exchanged between the base device 200 and the portable computing device 100 using a wireless communication channel.

Examples of radio protocols include the Bluetooth protocol (Bluetooth Core Specification Version 3.0 2009) and the ZigBee Protocol (ZigBee Alliance 2014, based on IEEE 802.15.4). For example, if the wireless communication components 130 and 230 use the Bluetooth protocol, the wireless communication components 130 and 230 may pair with each other under control of the pairing portion 136 of processor 132 using Simple Secure Pairing (SSP) in which a PIN code (personal identification code) is automatically entered and/or the Just Works protocol is used. This will occur automatically on the first docking event and does not require user input for pairing.

Figure 3:
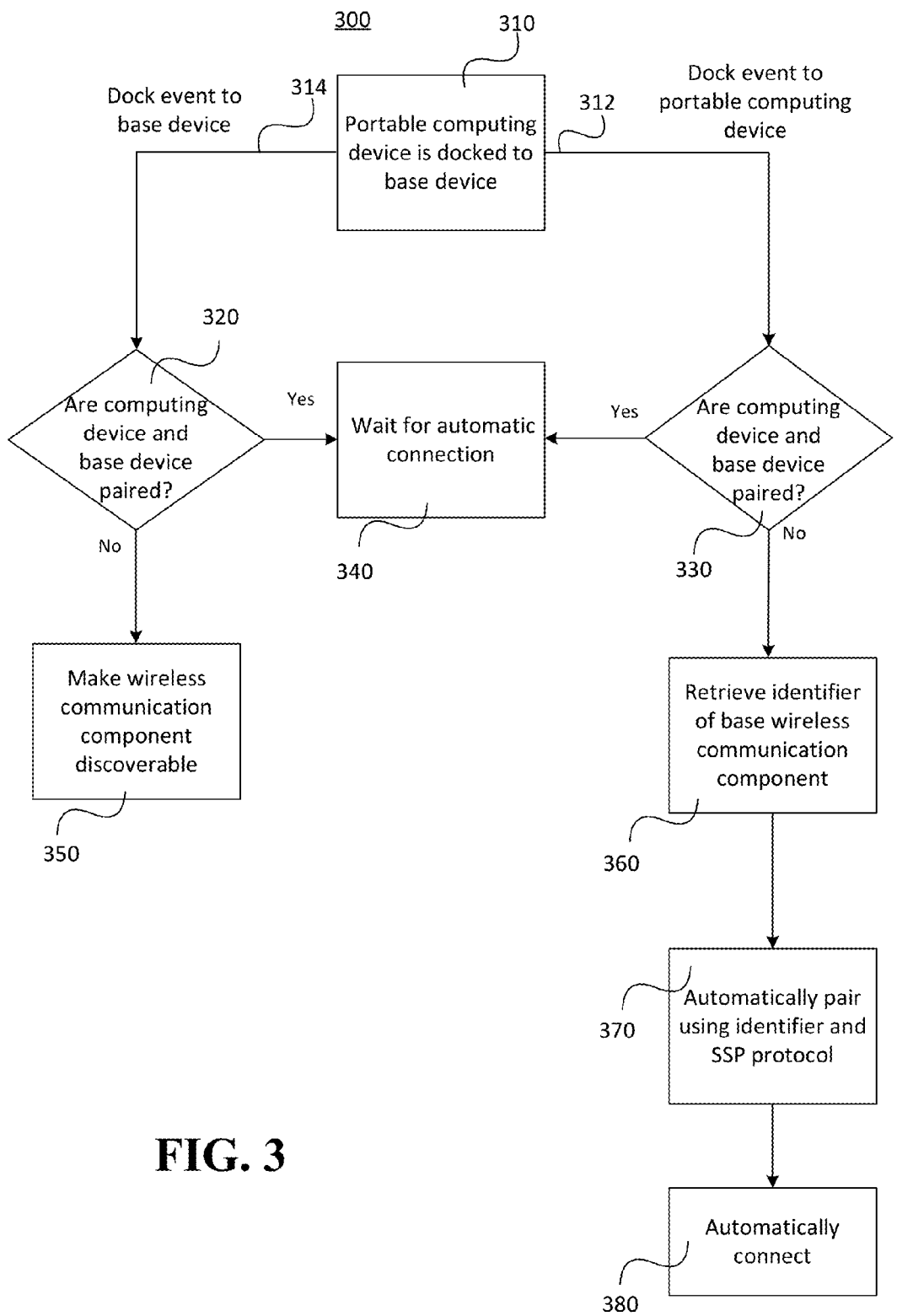
FIG. 3 is a flowchart of an example of a method of pairing and connecting according to an embodiment.

As an example, a flowchart of a method 300 is provided in FIG. 3. The example of FIG. 3 relates to an embodiment where the wireless communication components 130 and 230 use a Bluetooth protocol and includes both a case where the portable computing device 100 and the base device 200 dock for the first time and a case where the portable computing device 100 has already been paired to the base device 200. The method 300 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

With continuing reference to FIG. 3, the illustrated method 300 is only one example and the various blocks of FIG. 3 may take place in a different order or concurrently with other blocks shown in the flowchart. In the block 310, the portable computing device 100 is docked to the base device 200. The path 312 shows the effects of the dock event on the portable computing device 100 while the path 314 shows the effects of the dock event on the base device 200. The path 312 leads to the block 330 where the portable computing device 100 determines whether it is already paired to the base device 200 as the result of a previous docking between the portable computer computing device 100 and the base device 200. If the answer is yes, the portable computing device 100 follows block 340 and waits for automatic connection to the base device 200. This is because the portable computing device 100 and the base device 200 are configured to maintain a paired state following an initial docking event unless the devices are depaired from one another following a depairing process.

Similarly, in the block 320 the base device 200 determines whether it is paired to the portable computing device 100. If yes, the base device 200 waits for automatic connection in block 340. If no, the base device 200 makes its wireless communication component 230 discoverable in block 350. Note that, in an alternative to block 350, the wireless communication component 230 may already be in a discoverable state.

Returning the portable computing device path, if it is determined that the portable computing device 100 is not paired to the base device 200, the portable computing device 100 retrieves an identifier of the base wireless communication component 230 in the block 360 typically through communication between the embedded controller 150 and 250 that passes through the docking ports 120 and 220 on the communication paths 252 and 124. Once the identifier has been retrieved, automatic pairing using the identifier and the SSP protocol occurs in the block 370. Following pairing, whether the devices were already paired in the block 340 or have just been paired in the block 370, automatic wireless connection occurs in the block 380 between the portable computing device 100 and the base device 200.

Figure 4:
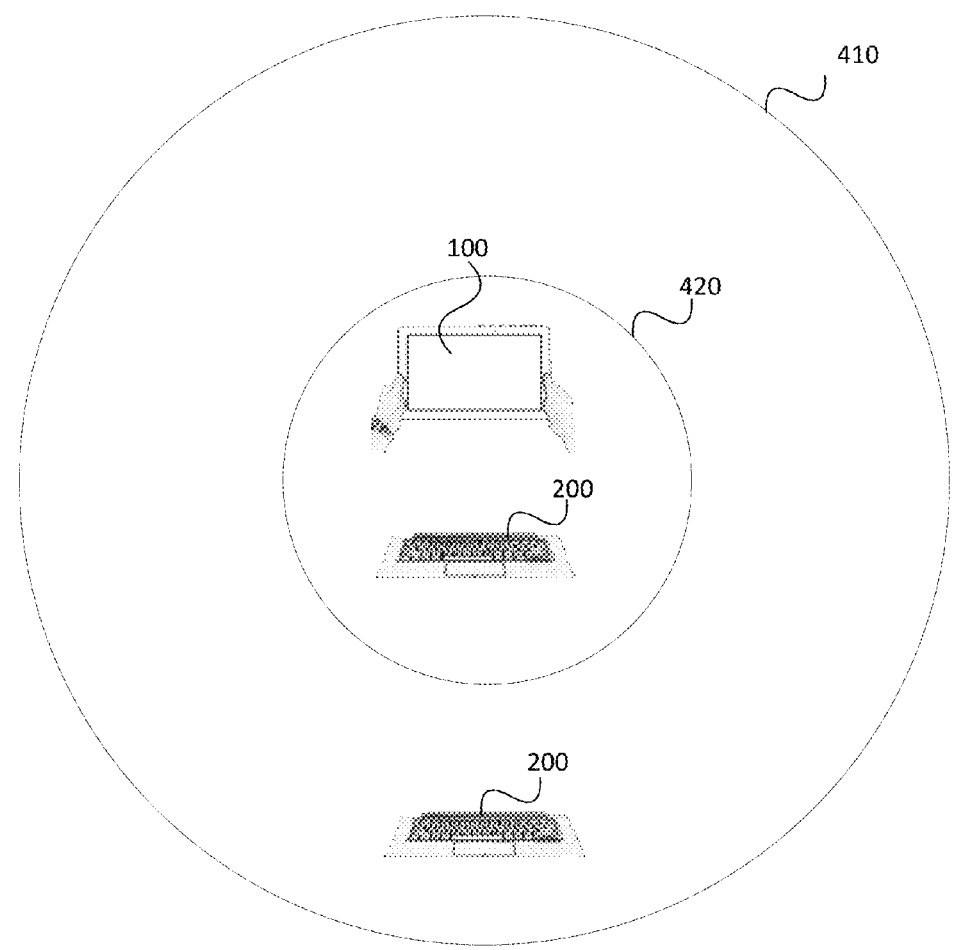
FIG. 4 is an illustration of an example of base device proximity determination.

In an embodiment depicted in FIG. 4, proximity sensing is used to determine whether the base device 200 is in a range convenient for a user to input information via the keyboard 290 to the portable computing device 100. In general, a wireless communication range, indicated by a boundary 410, is larger than a range, indicated by a boundary 420, that is convenient for a user to input information via the keyboard 290. For example, the wireless range 410 may be on the order of 20-30 feet while the convenience range may be on the order of 0-5 feet. Typically, a range is determined to be a convenient range 420 when the user can easily see a screen 105 of the portable computing device (seen in FIG. 1) so that the data being input via keyboard 290 can be read by the user on screen 105. Beyond the convenience range 420, the user would typically prefer to input data via a touchscreen keyboard without interference from the keyboard 290 of the base device 200. When beyond the convenience range, the portable computing device 100 may ignore data from the base device 200, permitting the touchscreen keyboard to be brought up on the portable computing device 100.

There are multiple ways in which proximity of the portable computing device 100 and the base device 200 can be determined. In one embodiment both the wireless communication components 130 and 230 are Bluetooth wireless communication components. For this embodiment, Bluetooth discovery probes may be used. Bluetooth discovery responses contain Signal Strength and Link Quality information. These two pieces of metadata may be used by the processor 132, the embedded controller 150 or the embedded controller 250 to approximate proximity distance between the portable computing device 100 and the base device 200. Either the portable computing device 100 may initiate the probes, or the base device may initiate the probes. In one embodiment, the portable computing device may initiate the probes, proximity may be calculated, and input from the base device may be selectively ignored based on proximity. That is, when the base device is outside of the boundary 420 but still within boundary 410, input from the base device may be selectively ignored. In such a case the user will be able to use a touchscreen keyboard or other touchscreen interface to enter data.

In another embodiment, the base device 200 may initiate the probes, and send the proximity information to the portable computing device 100 using the Bluetooth wireless connection.

In another embodiment, Bluetooth LE (Bluetooth Smart) may be used, where the proximity profile can be used by either the portable computing device 100 or the base device 200 to query proximity. Using the proximity data, it is determined whether the base device 200 is within the convenience range 420 or outside the convenience range 420.

With non-Bluetooth wireless communication components 130 and 230, signal strength can be used to approximate proximity and determine whether the base device 200 and the portable computing device 100 are within the distance set by boundary 420.

To the extent various operations or functions are described herein, they can be described or defined as hardware circuitry, software code, instructions, configuration, and/or data. The content can be embodied in hardware logic, or as directly executable software ("object" or "executable" form), source code, or low level assembly language code in an instruction set for a specific processor. The software content of the embodiments described herein can be provided via an article of manufacture with the content stored thereon, or via a method of operating a communication interface to send data via the communication interface.

A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

ADDITIONAL NOTES AND EXAMPLES

Example 1 may include an apparatus to facilitate pairing in a portable computing device including an embedded controller, an input/output (JO) controller coupled to the embedded controller, a first wireless communication component coupled to the JO controller, and a processor coupled to the first wireless communication component. The processor receives a dock event notification, wherein a wireless identifier from a base device is received via one or more of the embedded controller, the JO controller, or the first wireless communication component to initiate automatic pairing between the portable computing device and a second wireless communication component in the base device.

Example 2 may include the apparatus of Example 1, further including a connection portion of the processor to automatically form a wireless connection between the portable computing device and the base device.

Example 3 may include the apparatus of Example 1 or 2, further including a first docking port to connect with a second docking port on the base device.

Example 4 may include the apparatus of Example 3, further including a first electrical communication path between the first docking port and the embedded controller and a second electrical communication path between the first docking port and the processor.

Example 5 may include the apparatus of Example 4 wherein the first electrical communication path form part of an out-of-band channel for transmission of the identifier.

Example 6 may include the apparatus of Example 1 or 2 wherein the identifier is a Media Access Control (MAC) address or a PIN (personal identification number) code.

Example 7 may include the apparatus of Example 1 or 2, wherein the first wireless communication component is a Bluetooth or ZigBee wireless communication component configured to transmit proximity information and to selectively ignore transmissions from the second wireless communication component when the proximity is greater than a predetermined range.

Example 8 may include the apparatus of Example 3, wherein the first docking port includes a docking switch.

Example 9 may include an apparatus to facilitate pairing in a portable computing device, including a processor to receive a dock event notification when the portable computing device docks with a base device, an identifier retriever to retrieve the identifier of a first wireless communication component in a base device; and a pairing portion of the processor to automatically pair a second wireless communication component in a portable computing device with the first wireless communication component in the base device.

Example 10 may include the apparatus of Example 9, further including a connection portion of the processor to automatically form a wireless connection between the portable computing device and the base device.

Example 11 may include the apparatus of Example 9 or 10, further including an embedded controller.

Example 12 may include the apparatus of Example 9 or 10, further including a first docking port to connect with a second docking port on the base device.

Example 13 may include the apparatus of Example 10, further including a first electrical communication path between the first docking port and the embedded controller and a second electrical communication path between the first docking port and the processor.

Example 14 may include the apparatus of Example 13, wherein the first electrical communication path forms part of an out-of-band channel for transmission of the identifier Example 15 may include the apparatus of Example 9 or 10, wherein the identifier is a Media Access Control (MAC) address or a PIN (personal identification number) code.

Example 16 may include the apparatus of Example 9 or 10, wherein the first wireless communication component is a Bluetooth or ZigBee wireless communication component configured to transmit proximity information and to selectively ignore transmissions from the second wireless communication component when the proximity is greater than a predetermined range.

Example 17 may include the apparatus of Example 12, wherein the first docking port includes a docking switch.

Example 18 may include an apparatus to facilitate pairing in a base device including a first wireless communication component, an embedded controller including a query receiver to receive a query from a portable computing device regarding an identifier of a first wireless communication component in the base, an identifier transmitter to transmit the identifier of the first wireless communication component to the portable computing device wherein the first wireless communication component is to automatically pair to a second wireless communication component of the portable computing device. A keyboard is coupled to the embedded controller.

Example 19 may include the apparatus of Example 18, further including a docking port.

Example 20 may include the apparatus of Example 19, further including an electrical communication path between the docking port and the embedded controller wherein the electrical communication path forms a portion of an out-of-band channel for transmission of the identifier.

Example 21 may include the apparatus of Example 18 or 19, further comprising a power source to power the first wireless component to be in a discoverable state.

Example 22 may include the apparatus of Example 18 or 19, wherein the identifier is a Media Access Control (MAC) address or a PIN (personal identification number) code.

Example 23 may include the apparatus of Example 18 or 19, wherein the first wireless communication component is a Bluetooth or ZigBee wireless communication component configured to transmit proximity information.

Example 24 may include an apparatus to facilitate pairing in a base device, including a query receiver to receive a query from a portable computing device regarding an identifier of a first wireless communication component in the base, an identifier transmitter to transmit the identifier of the first wireless communication component to the portable computing device, wherein the first wireless communication component is to automatically pair with a second wireless communication component of the portable computing device.

Example 25 may include the apparatus of Example 24, further including a docking port.

Example 26 may include the apparatus of Example 24, wherein the query receiver and the identifier transmitter form part of an embedded controller.

Example 27 may include the apparatus of Example 26, further including a docking port and an electrical communication path between the docking port and the embedded controller.

Example 28 may include the apparatus of Example 27, wherein the electrical communication path forms part of an out-of-band channel for transmission of the identifier.

Example 29 may include the apparatus of Example 24 or 25, wherein the identifier is a Media Access Control (MAC) address or a PIN (personal identification number) code.

Example 30 may include the apparatus of Example 24 or 25, wherein the first wireless communication component is a Bluetooth or ZigBee wireless communication component configured to transmit proximity information.

Example 31 may include a method of facilitating pairing in a portable computing device including receiving a dock event notification, retrieving an identifier of a base device wireless communication component in response to the dock event notification, and automatically pairing a first wireless communication component of the portable computing device with a second wireless communication component of the base device based on the identifier.

Example 32 may include the method of Example 31, further including automatically wirelessly connecting the portable computing device and the base device.

Example 33 may include the method of Example 31 or 32, further including determining the proximity of the base device to the portable computing device.

Example 34 may include the method of Example 33, further including selectively ignoring data input to the base device when the proximity of the base device and the portable computing device is found to be outside a predetermined convenience range.

Example 35 may include at least one computer readable storage medium comprising a set of instructions which, when executed by a portable computing device, cause the portable computing device to read a dock event notification when a portable computing device docks with a base device, retrieve an identifier of a base device wireless communication component upon receiving the dock event notification, and automatically pair a first wireless communication component of the portable computing device with a second wireless communication component in the base device.

Example 36 may include the at least one computer readable storage medium of Example 35, wherein the instructions, when executed, cause the portable computing device to automatically wirelessly connect the portable computing device and the base device.

Example 37 may include the at least one computer readable storage medium of Example 35 or 36, wherein the instructions, when executed, cause the portable computing device to determine the proximity of the base device to the portable computing device.

Example 38 may include the at least one computer readable storage medium of Example 37, wherein the instructions, when executed, cause the portable computing device to selectively ignore data input to the base device when the proximity of the base device and the portable computing device is found to be outside a predetermined convenience range.

Example 39 may include a method of facilitating pairing in a base device including receiving a query from a portable computing device regarding an identifier of a first wireless communication component of the base device, sending the identifier of the first wireless communication component to the portable computing device, and instructing the first wireless communication component to automatically pair with a second wireless communication component of the portable computing device.

Example 40 may include the method of Example 39, further including automatically forming a wirelessly connection between the base and the portable computing device.

Example 41 may include the method of Example 39 or 40, further including determining the proximity of the base device to the portable computing device.

Example 42 may include at least one computer readable storage medium comprising a set of instructions which, when executed by a base device, cause the base device to receive a query from a portable computing device regarding an identifier of a first wireless communication component in the base device, send the identifier of the first wireless communication component in the base to the portable computing device, and automatically pair the base wireless communication component to a portable computing device wireless communication component.

Example 43 may include the at least one computer readable storage medium of Example 42, wherein the instructions, when executed, cause the base device to automatically form a wireless connection between the base and the portable computing device.

Example 44 may include the at least one computer readable storage medium of Example 42 or 43, wherein the instructions, when executed, determine the proximity of the base device to the portable computing device.

Example 45 may include an apparatus to facilitate pairing in a portable computing device including means for receiving a dock event notification, means for retrieving an identifier of a base device wireless communication component in response to the dock event notification, and means for automatically pairing a first wireless communication component of the portable computing device with a second wireless communication component of the base device based on the identifier.

Example 46 may include the apparatus of Example 45, further including means for automatically forming a wireless connection between the portable computing device and the base device.

Example 47 may include the apparatus of Example 45 or 46, further including means for determining the proximity of the base device to the portable computing device.

Example 48 may include the apparatus of Example 47, further including means for selectively ignoring data input to the base device when the proximity of the base device and the portable computing device is found to be outside a predetermined convenience range.

Example 49 may include an apparatus to facilitate pairing in a base device including means for receiving a query from a portable computing device regarding an identifier of a first wireless communication component of the base device, means for sending the identifier of the first wireless communication component to the portable computing device, and means for instructing the first wireless communication component to automatically pair with a second wireless communication component of the portable computing device.

Example 50 may include the apparatus of Example 49, further including means for automatically forming a wireless connection between the base and the portable computing device.

Example 51 may include the apparatus of Example 49 or 50, further including means for determining the proximity of the base device to the portable computing device.

Techniques and apparatus described herein may facilitate automatic pairing and connection between a portable computing device and a base device without the need for user intervention. The transmission of identifier information on an out-of-band channel prevents man in the middle attacks. Proximity sensing permits the portable computing device to ignore data from the base device when it is out of a convenience range for use of a keyboard but still within a wireless connection range. This permits a touchscreen keyboard to be accessible on the portable computing device. If a power mechanism such as a battery is included in the base device, the base wireless communication component can be set to an active, discoverable condition, eliminating the need to power on the wireless communication component. Further, there is no need for a user to place a base in a discovery mode, e.g., by means of a switch, or to enter any kind of code. The invention further eliminates the requirement for factory pre-pairing of a portable computing device and base or extra hardware such as plug-in wireless transmitter that has been pre-paired. This enables formation of a 2-in-1 device with automatic pairing that does not require factory pre-pairing or user interaction to pair a portable computer device with a base.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Additionally, it is understood that the indefinite articles "a" or "an" carries the meaning of "one or more" or "at least one."

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus to facilitate pairing in a portable computing device comprising: an embedded controller; an input/output (IO) controller coupled to the embedded controller; a first wireless communication component coupled to the IO controller; a processor coupled to the first wireless communication component, the processor to receive a dock event notification, wherein an identifier from a base device is received via one or more of the embedded controller, the IO controller, or the first wireless communication component to initiate automatic pairing between the portable computing device and a second wireless communication component in the base device; a first docking port to connect with a second docking port on the base device; and a first electrical communication path between the first docking port and the embedded controller and a second electrical communication path between the first docking port and the processor wherein the first electrical communication path forms part of an out-of-band channel for transmission of the identifier.

2. The apparatus of claim 1, further comprising:
a connection portion of the processor to automatically form a wireless connection between the portable computing device and the base device.

3. The apparatus of claim 1 wherein the identifier from the base device is a Media Access Control (MAC) address or a PIN (personal identification number) code.

4. The apparatus of claim 1, wherein the first wireless communication component is a Bluetooth or ZigBee wireless communication component configured to transmit proximity information and to selectively ignore transmissions from the second wireless communication component when the proximity information is greater than a predetermined range.

5. The apparatus of claim 1 wherein the first docking port includes a docking switch.

6. An apparatus to facilitate pairing in a portable computing device, comprising: a processor to receive a dock event notification when the portable computing device docks with a base device; an embedded controller; an identifier retriever to retrieve an identifier of a first wireless communication component in a base device; and a pairing portion of the processor to automatically pair a second wireless communication component in a portable computing device with the first wireless communication component in the base device; a first docking port to connect with a second docking port on the base device; a first electrical communication path between the first docking port and the embedded controller and a second electrical communication path between the first docking port and the processor wherein the first electrical communication path forms part of an out-of-band channel for transmission of the identifier.

7. The apparatus of claim 6, further comprising:
a connection portion of the processor to automatically form a wireless connection between the portable computing device and the base device.

8. The apparatus of claim 6 wherein the identifier of the first wireless communication component is a Media Access Control (MAC) address or a PIN (personal identification number) code.

9. The apparatus of claim 6, wherein the first wireless communication component is a Bluetooth or ZigBee wireless communication component configured to transmit proximity information and to selectively ignore transmissions from the second wireless communication component when the proximity information is greater than a predetermined range.

10. The apparatus of claim 6, wherein the first docking port includes a docking switch.

11. A base device comprising: a first wireless communication component; an embedded controller including, a query receiver to receive a query from a portable computing device regarding an identifier of the first wireless communication component in the base; an identifier transmitter to transmit an identifier of the first wireless communication component to the portable computing device, wherein the first wireless communication component is to automatically pair to a second wireless communication component of the portable computing device; and a keyboard coupled to the embedded controller; a docking port; an electrical communication path between the docking port and the embedded controller wherein the electrical communication path forms a portion of an out-of-band channel for transmission of the identifier.

12. The apparatus of claim 11 further comprising a power source to power the first wireless component to be in a discoverable state.

13. The apparatus of claim 11, wherein the identifier of the first wireless communication component is a Media Access Control (MAC) address or a PIN (personal identification number) code.

14. The apparatus of claim 11, wherein the first wireless communication component is a Bluetooth or ZigBee wireless communication component configured to transmit proximity information.

15. An apparatus to facilitate pairing in a base device, comprising: a query receiver to receive a query from a portable computing device regarding an identifier of a first wireless communication component in the base; and an identifier transmitter to transmit an identifier of the first wireless communication component to the portable computing device, wherein the first wireless communication component is to automatically pair with a second wireless communication component of the portable computing device; a docking port; an electrical communication path between the docking port and the embedded controller, wherein the electrical communication path forms part of an out-of-band channel for transmission of the identifier.

16. The apparatus of claim 15 wherein the query receiver and the identifier transmitter form part of an embedded controller.

17. The apparatus of claim 15, wherein the identifier of the first wireless communication component is a Media Access Control (MAC) address or a PIN (personal identification number) code.

18. The apparatus of claim 15, wherein the first wireless communication component is a Bluetooth or ZigBee wireless communication component configured to transmit proximity information.

* * * * *